United States Patent [19]

Richardson

[11] Patent Number: 5,143,737
[45] Date of Patent: Sep. 1, 1992

[54] METHOD TO PRODUCE UNSATURATED MILK FAT AND MEAT FROM RUMINANT ANIMALS

[75] Inventor: Thomas Richardson, Davis, Calif.

[73] Assignee: The Regents of the University of California, Alameda, Calif.

[21] Appl. No.: 597,997

[22] Filed: Oct. 15, 1990

Related U.S. Application Data

[63] Continuation-in-part of Ser. No. 420,905, Oct. 13, 1989, abandoned.

[51] Int. Cl.⁵ .............................................. A23K 1/00
[52] U.S. Cl. .................................... 426/002; 426/98; 426/583; 426/601; 426/602; 426/623; 426/630; 426/656; 426/657; 426/658; 426/807
[58] Field of Search ............... 426/658, 636, 2, 657, 426/89, 98, 583, 601, 602, 807, 656, 623, 630

[56] References Cited

U.S. PATENT DOCUMENTS

| | | | |
|---|---|---|---|
| 2,035,899 | 3/1936 | Kraft | 426/98 |
| 2,472,663 | 6/1949 | Kleine | 426/98 |
| 3,137,631 | 6/1964 | Soloway | 426/98 |
| 3,295,986 | 1/1967 | Saslaw | 426/98 |
| 4,216,234 | 8/1980 | Rawlines et al. | 426/98 |
| 4,248,899 | 2/1981 | Lyon et al. | 426/98 |
| 4,808,429 | 2/1989 | Freeman | 426/98 |
| 4,839,179 | 6/1989 | Hirsbrunner | 426/98 |

OTHER PUBLICATIONS

Webb "Byproducts from milk" Avi Publishing Co. Westport, Conn. 2nd Edition (1970) pp. 18-20.
Hawley "The Condensed Chemical Dictionary" Van Nostrand Reinhold Co. New York, NY 10th edition p. 154.

Primary Examiner—Penland, R. B.
Attorney, Agent, or Firm—Phillips, Moore Lempio & Finley

[57] ABSTRACT

The present invention relates to an improved method for the modification of a food for a ruminant mammal such that the mammal will produce a modified milk fat or meat fat which method comprises:
(a) producing an emulsion of
 (i) a non-toxic food substance to be encapsulated; and
 (ii) an acid sensitive nontoxic crosslinkable material which will surround and encapsulate the substance with the proviso that no added crosslinking chemical is present in the emulsion; (b) subjecting the emulsion to reaction conditions which crosslink the crosslinkable material and encapsulate the substance. Specifically, the method is useful to encapsulate emulsified unsaturated fatty acids with a natural protein such as whey protein concentrate containing a reducing sugar, such as lactose, with crosslinking and encapsulating using the Maillard browning reaction. Cattle sheep or goats feed the modified food produce a higher level of unsaturated milk fat and meat fat. These food products having more unsaturated fat and less saturated fat are useful as food for mammals, especially human beings.

8 Claims, 14 Drawing Sheets

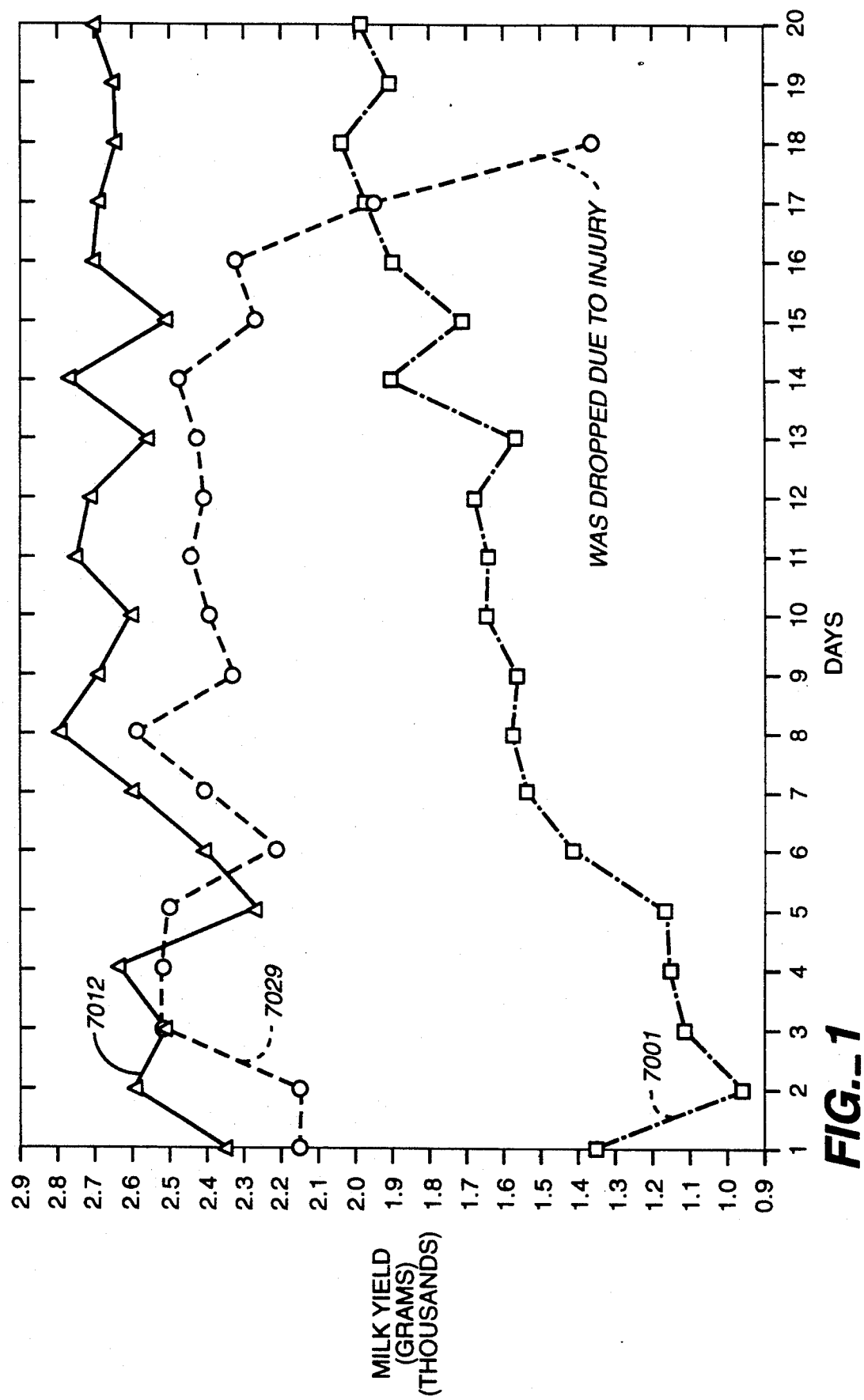
FIG._1

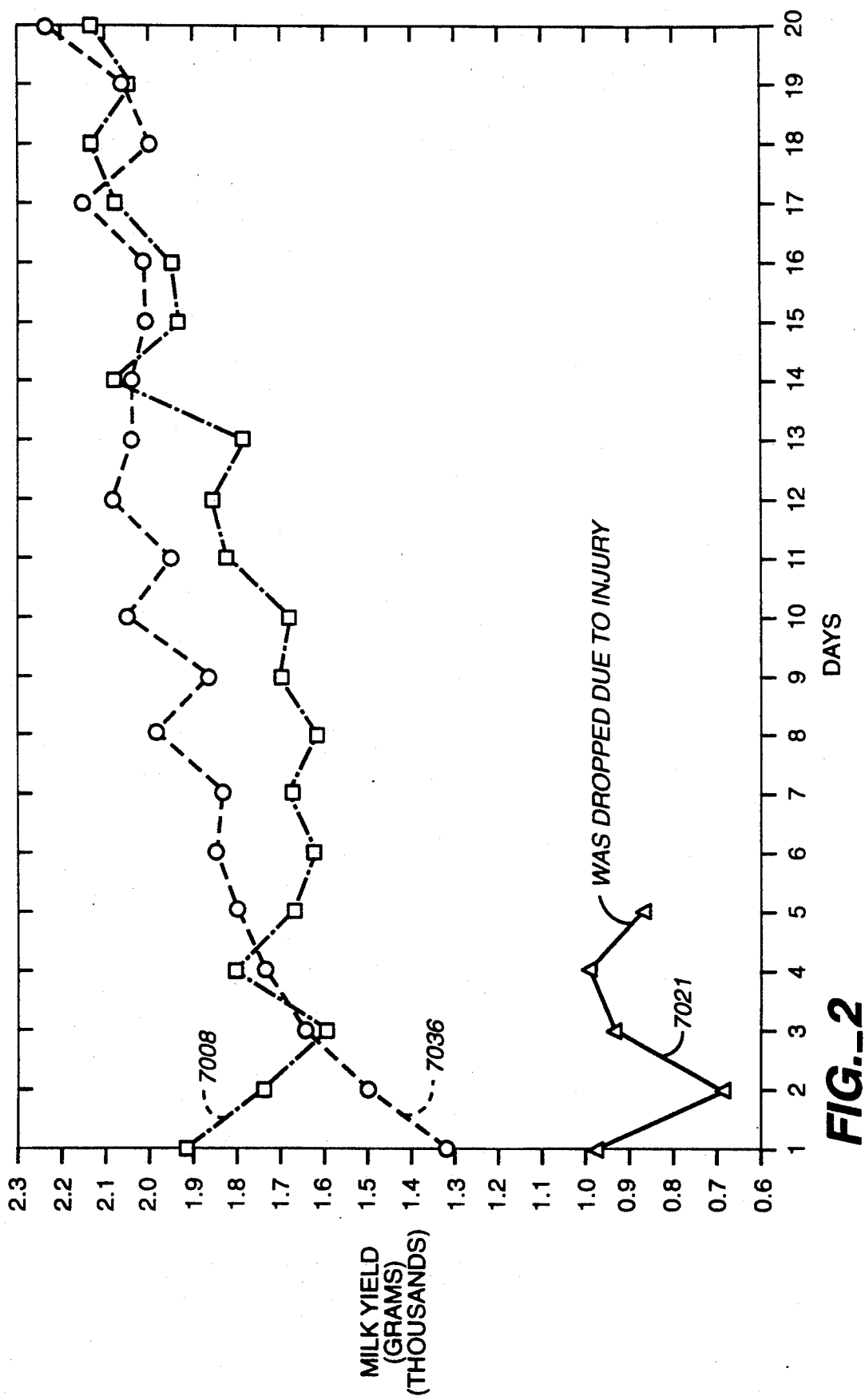
FIG._2

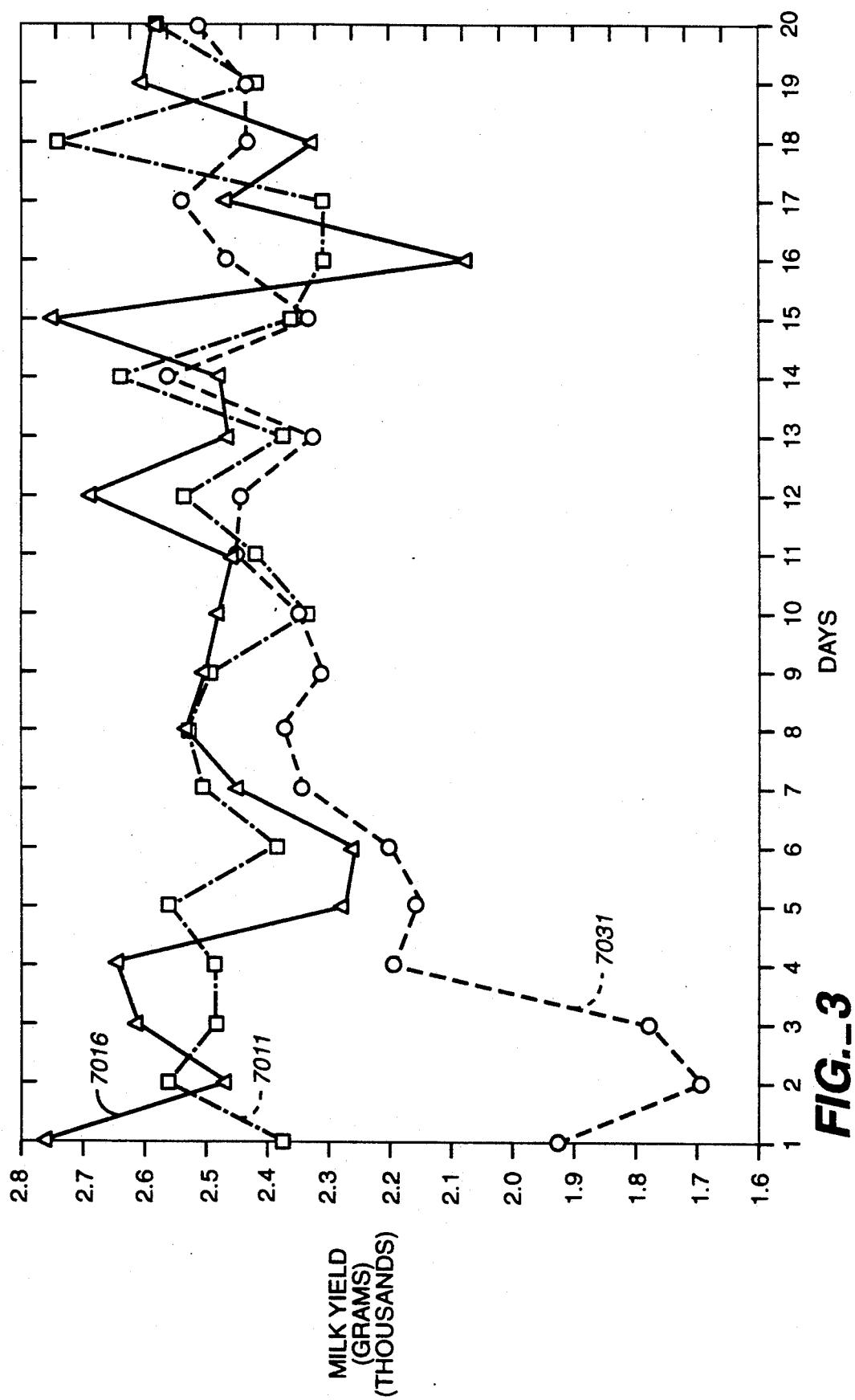

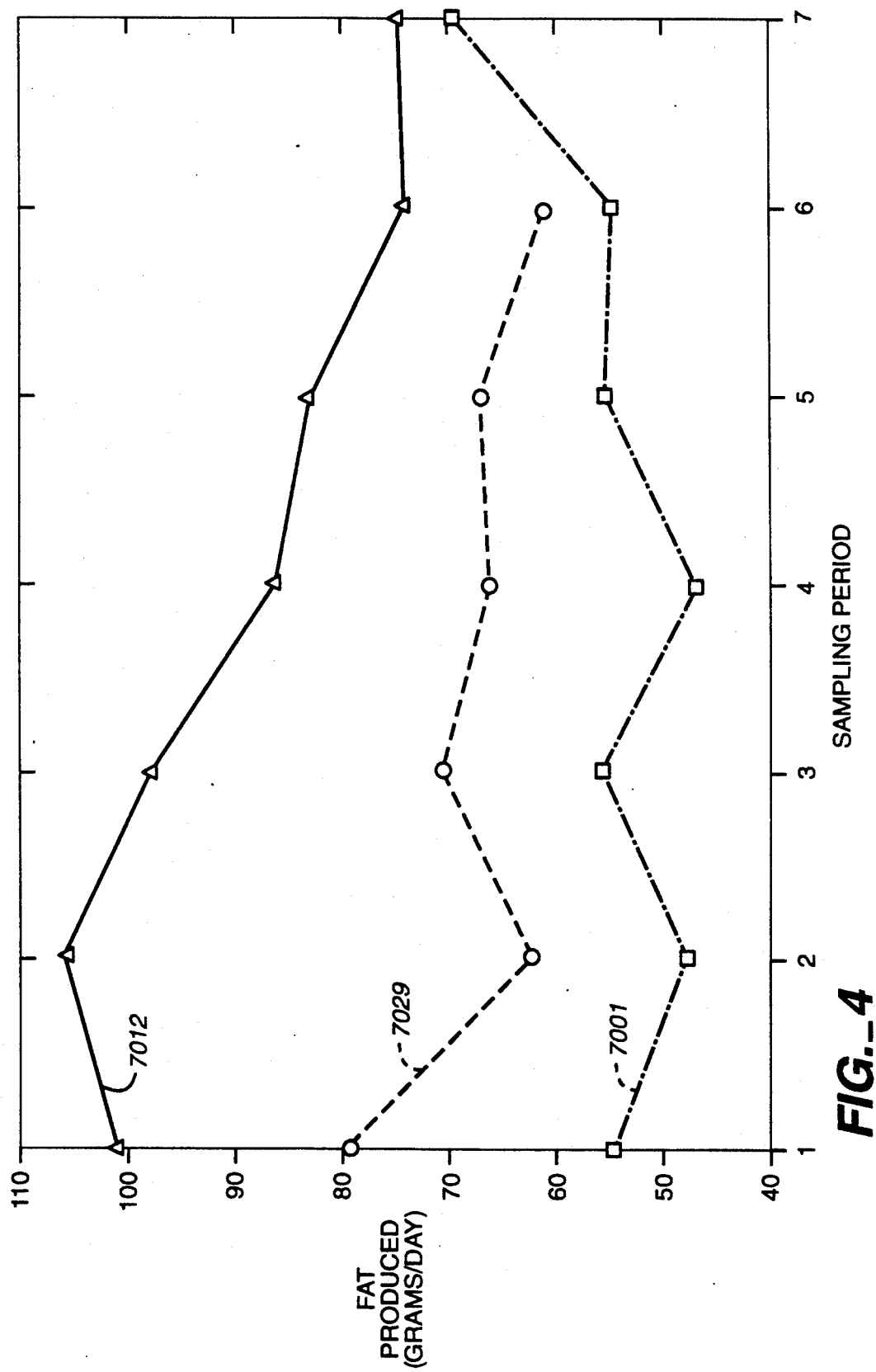
FIG._4

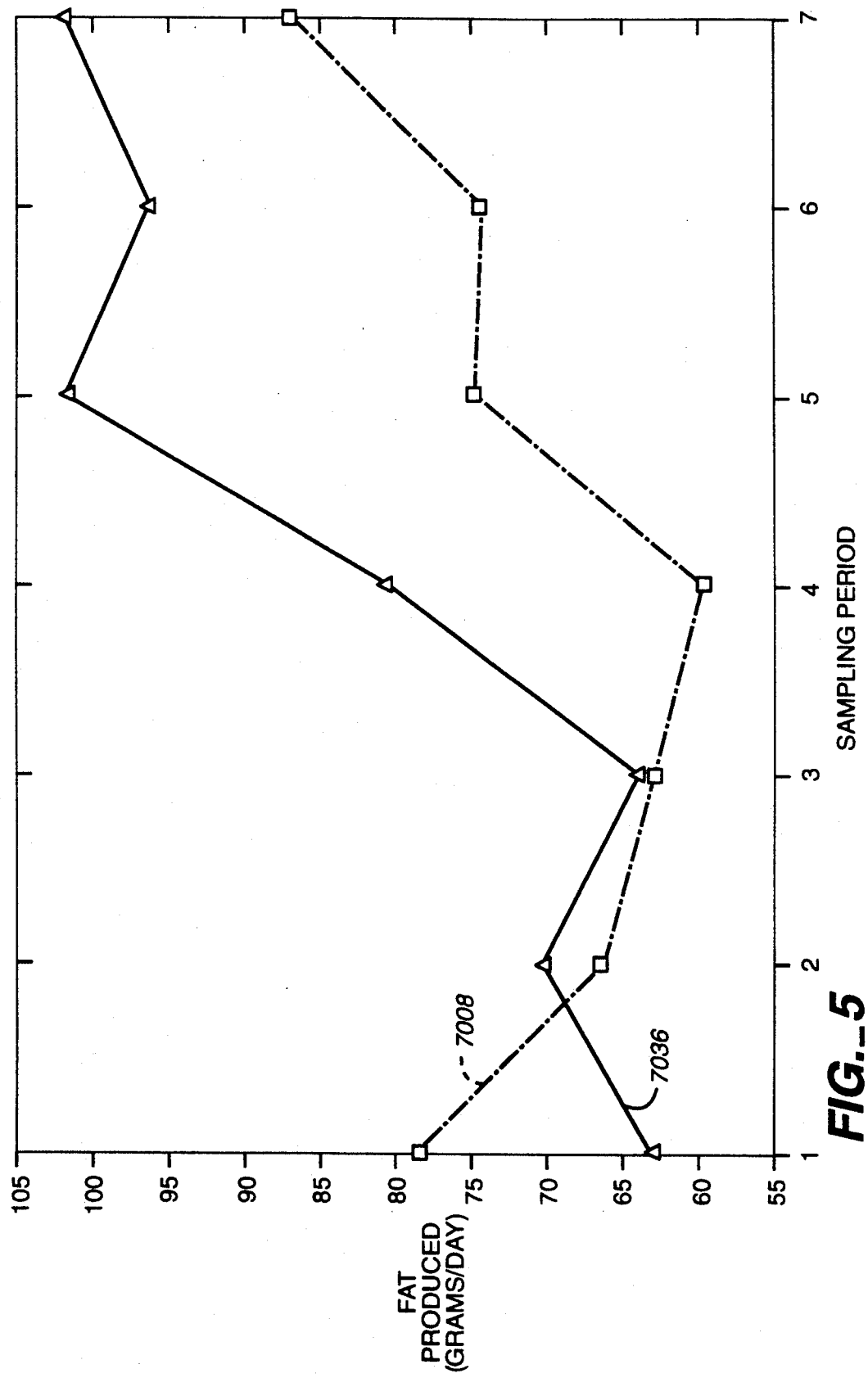
FIG._5

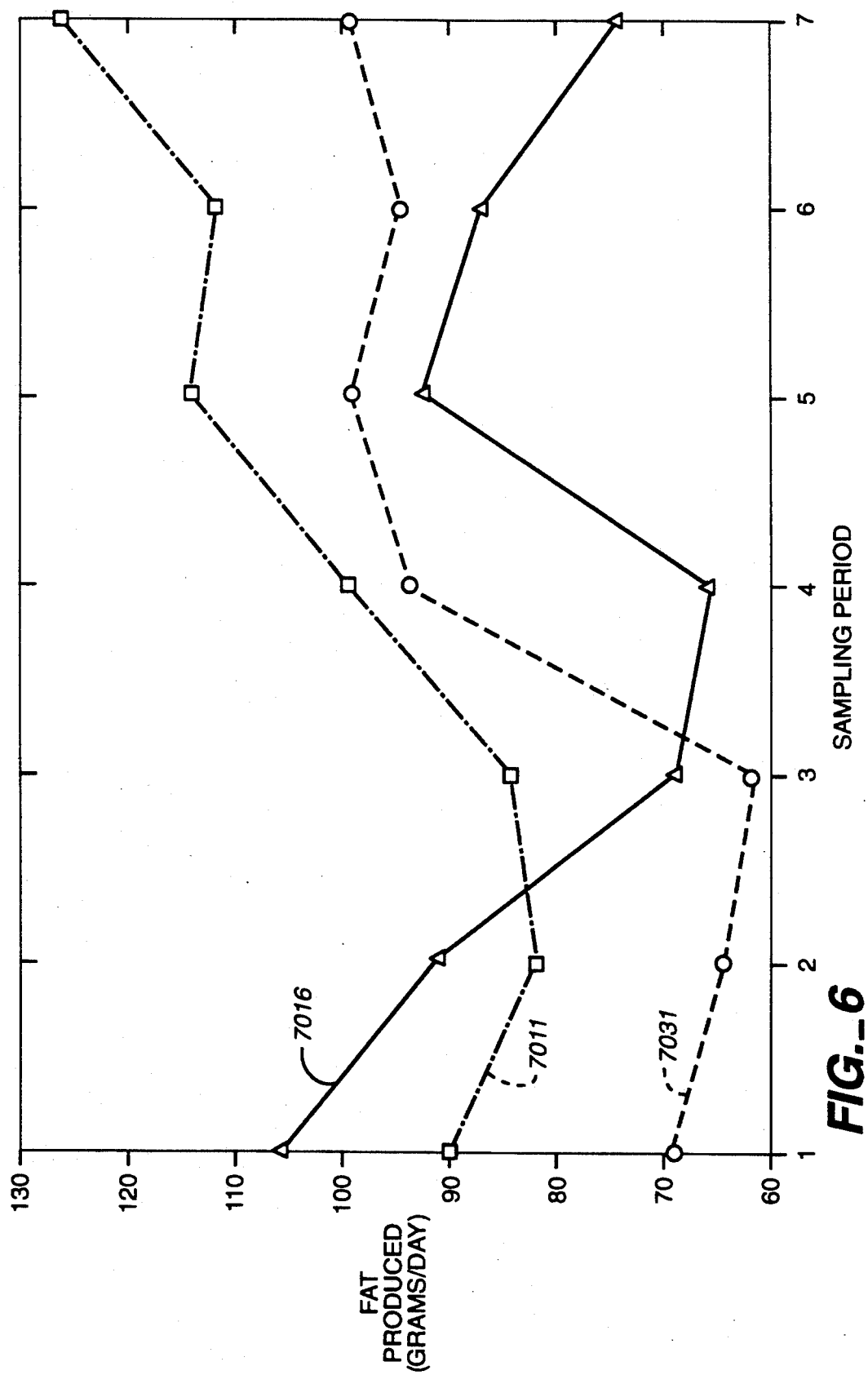
FIG._6

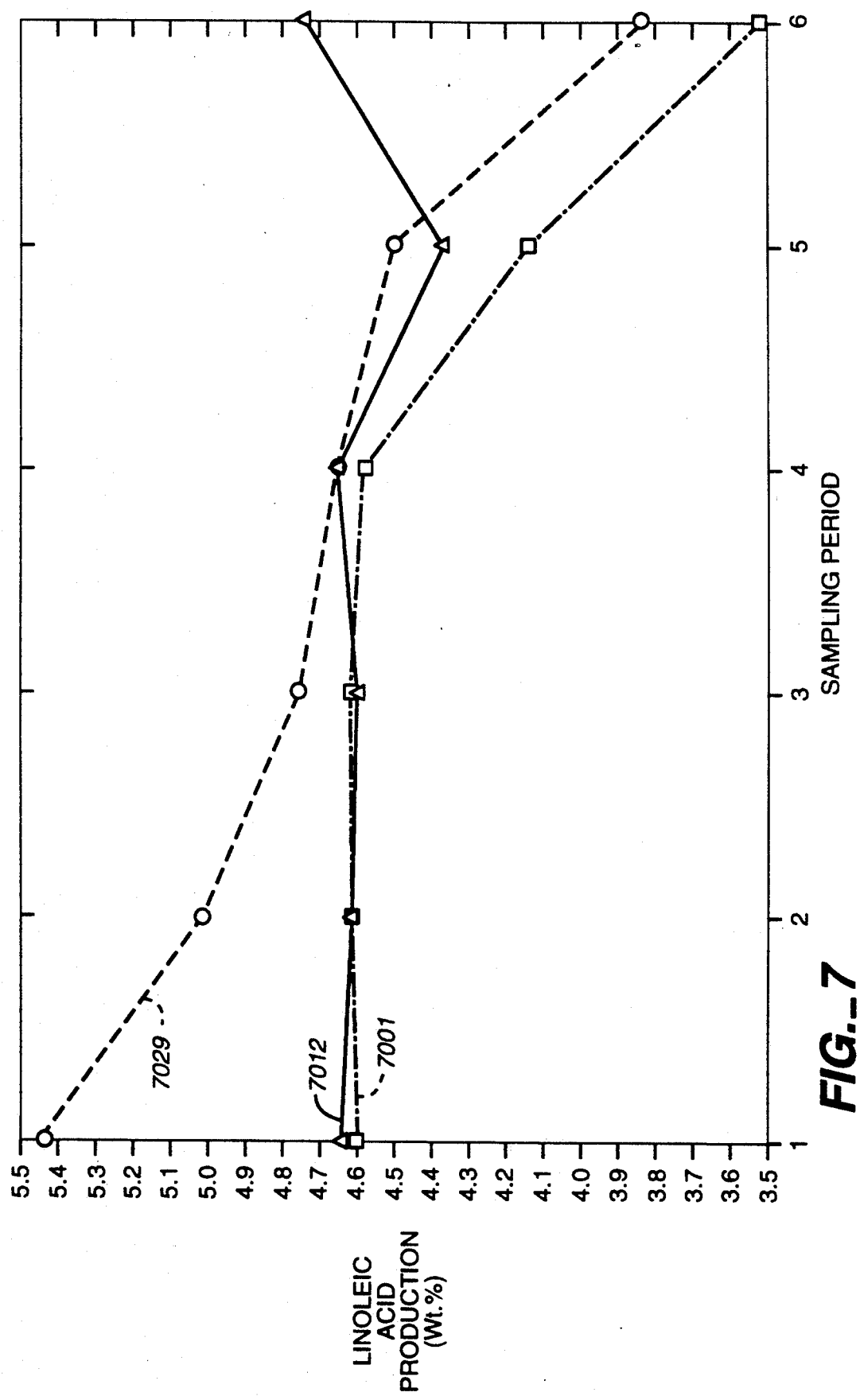
FIG._7

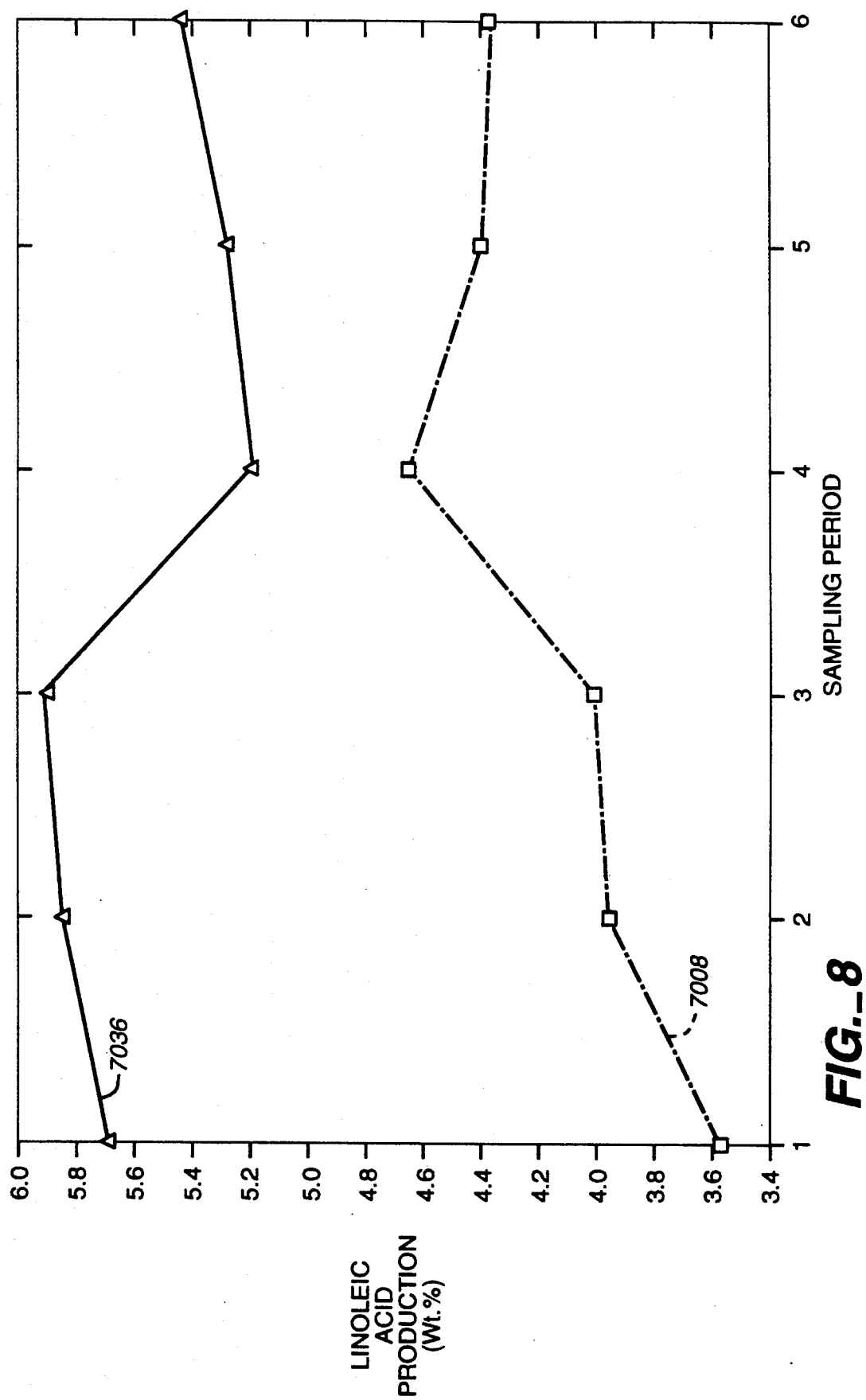
FIG._8

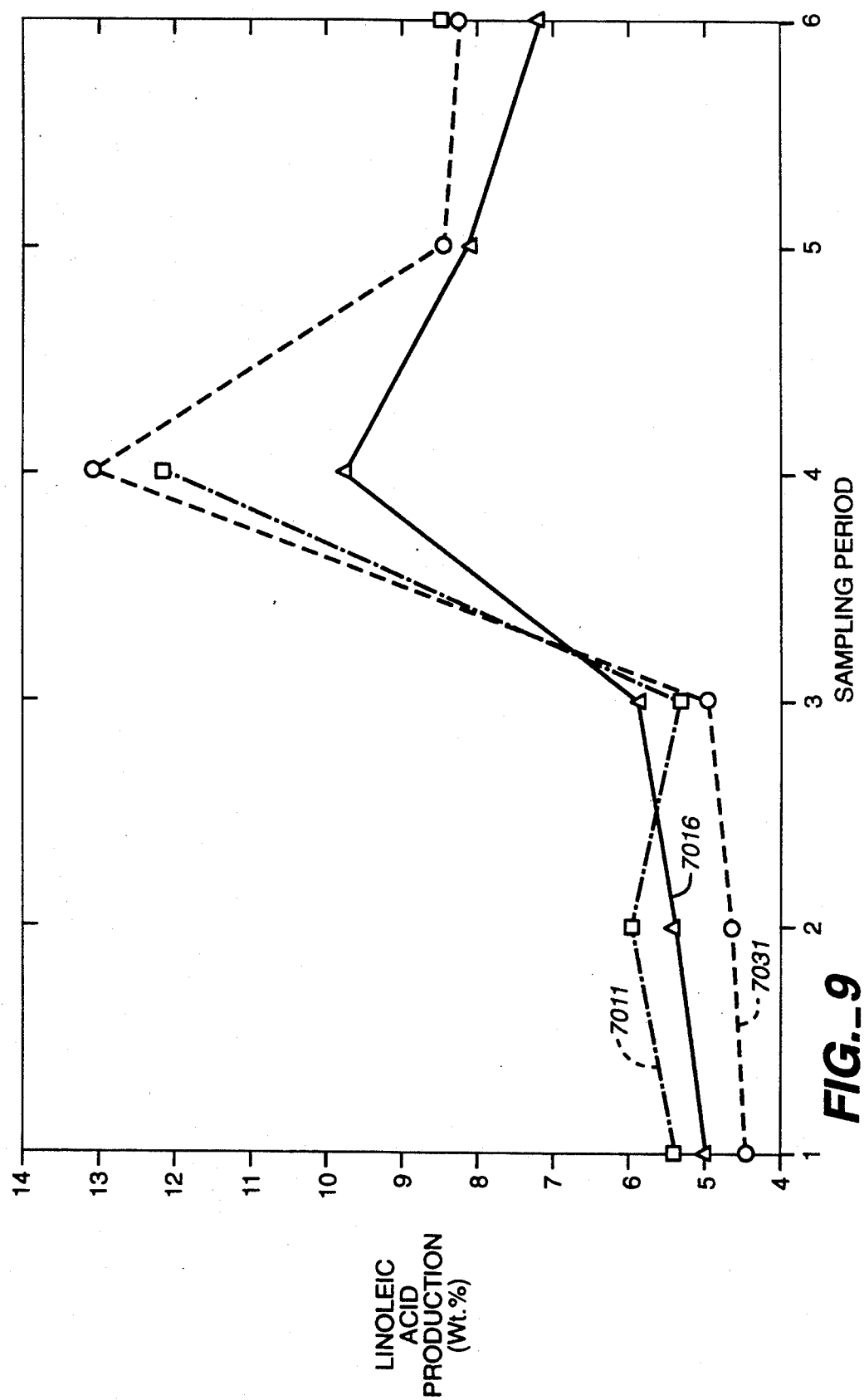
FIG._9

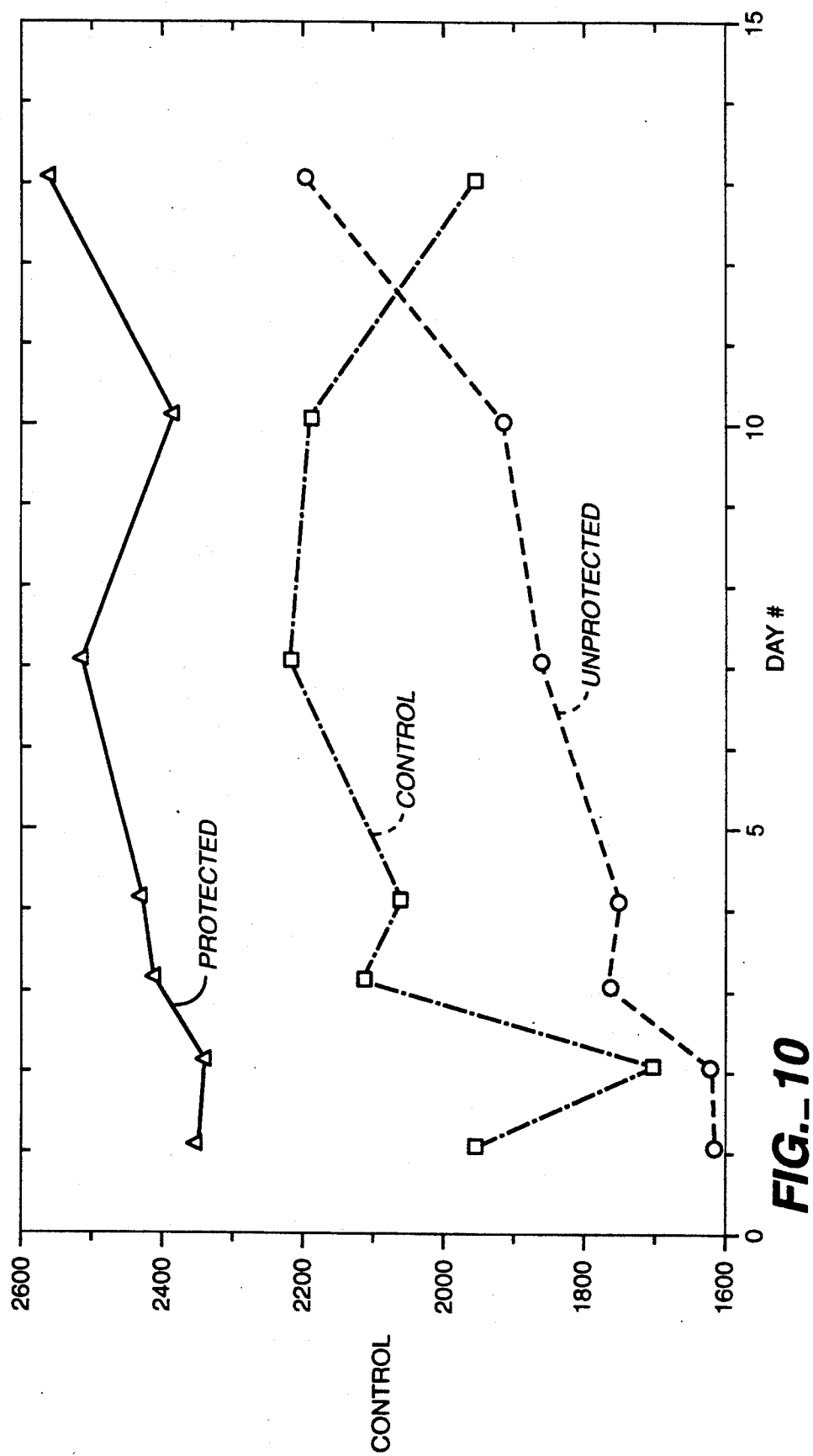
FIG._10

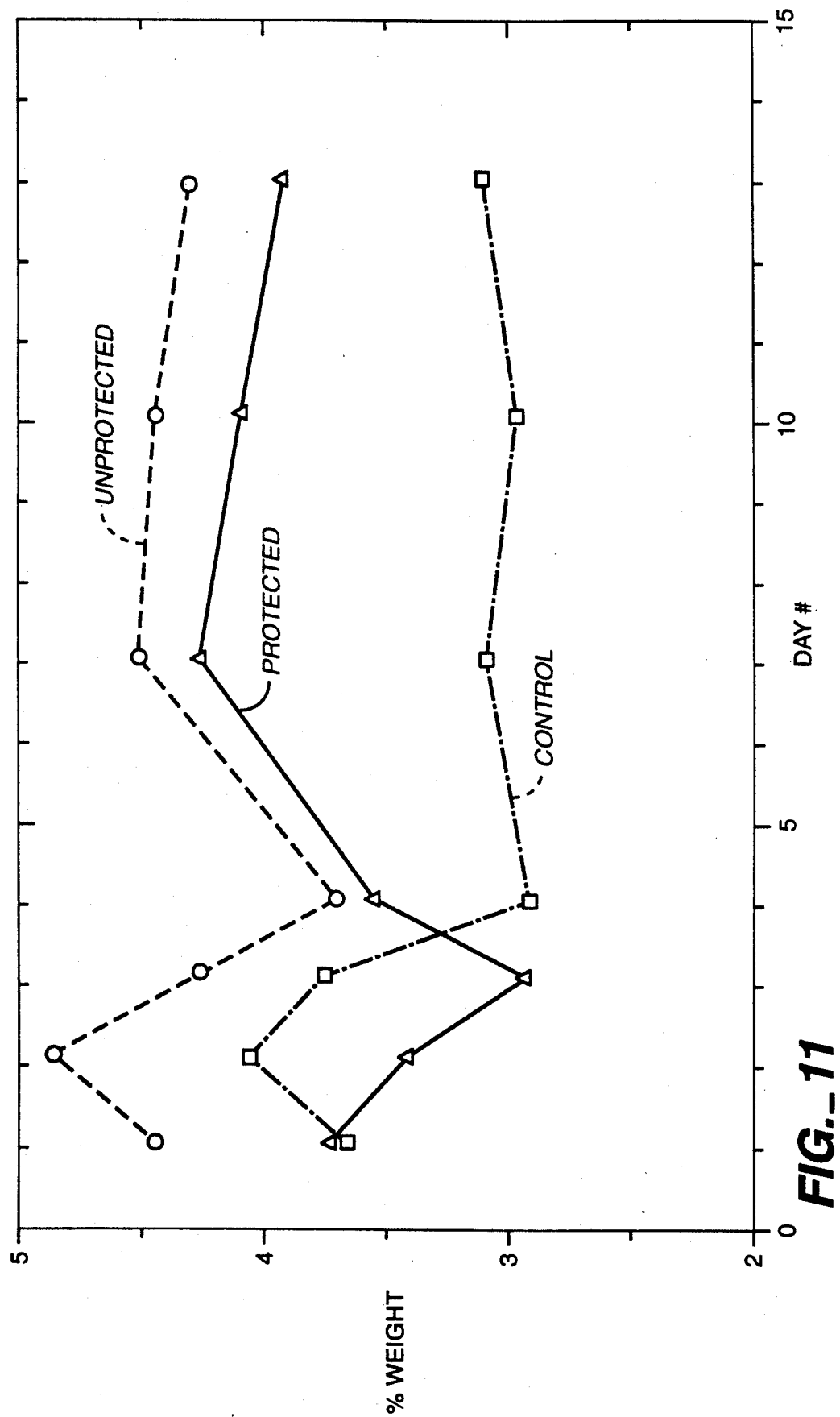
FIG._11

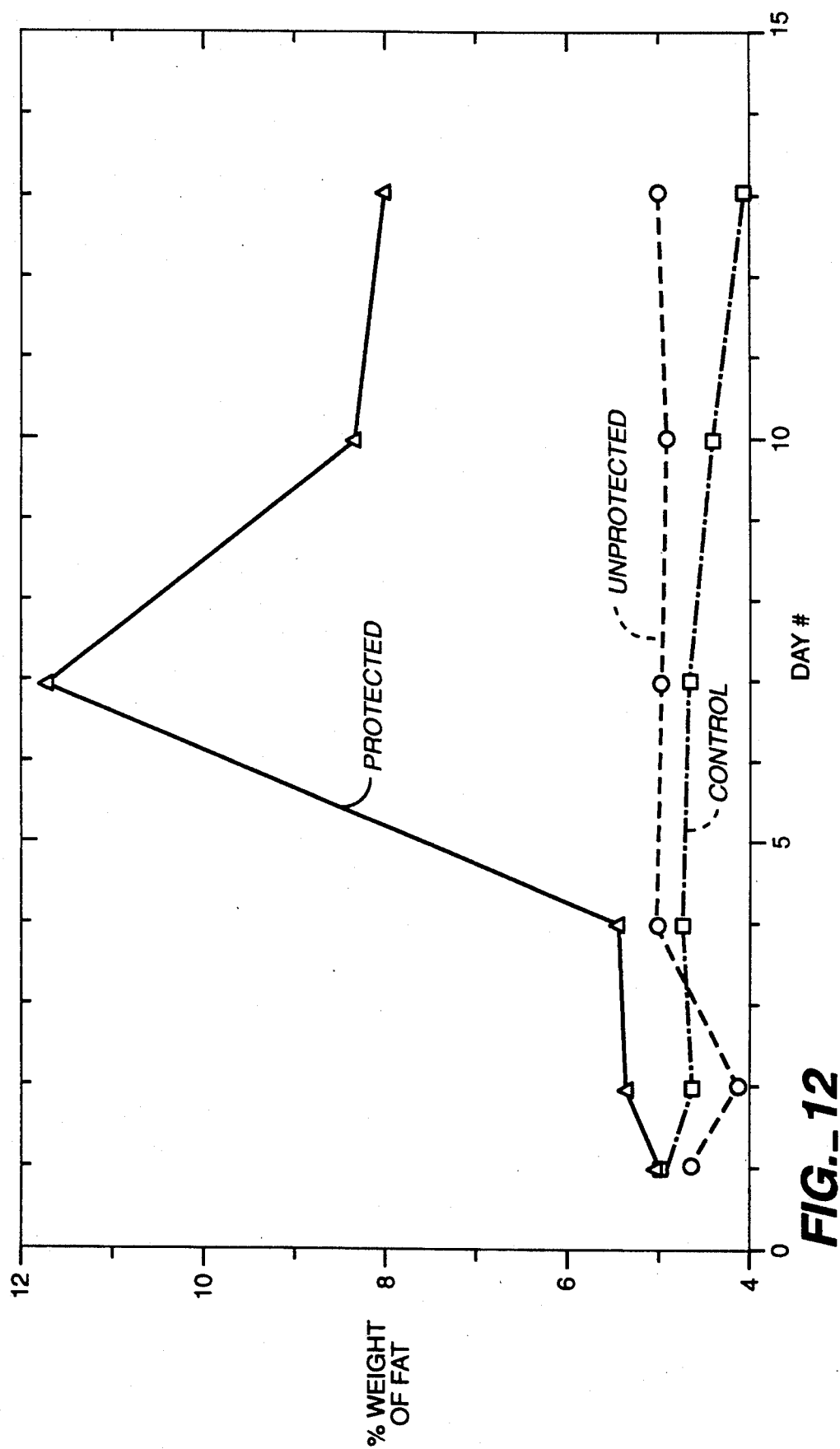
FIG._12

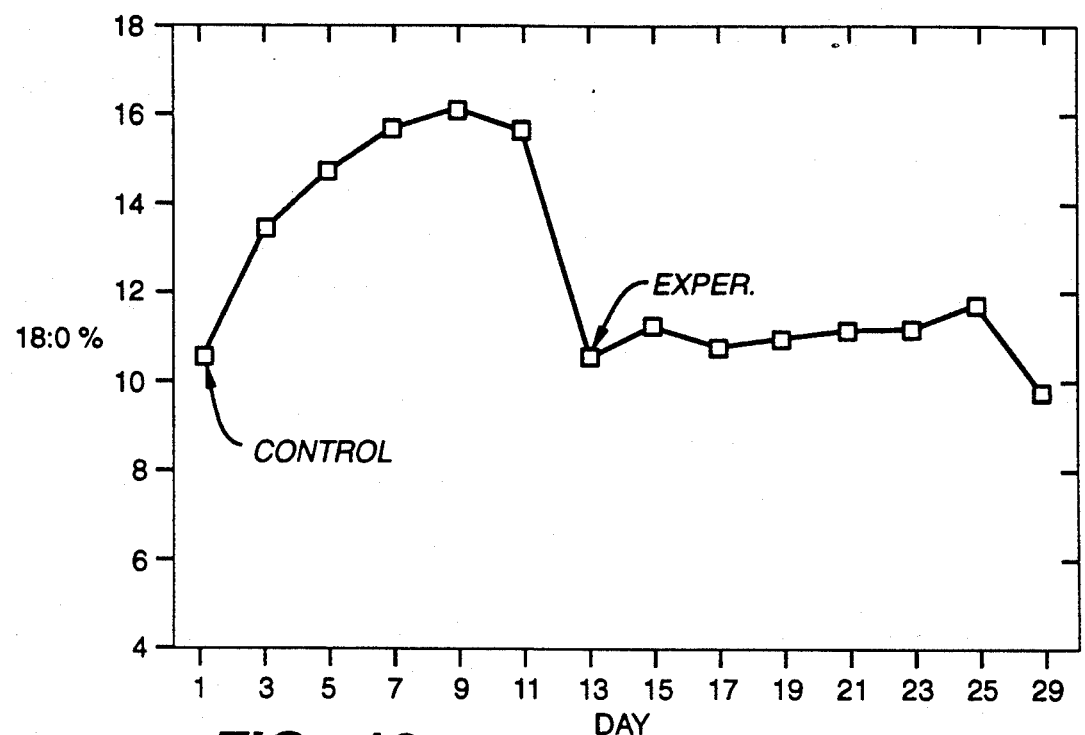
FIG._13
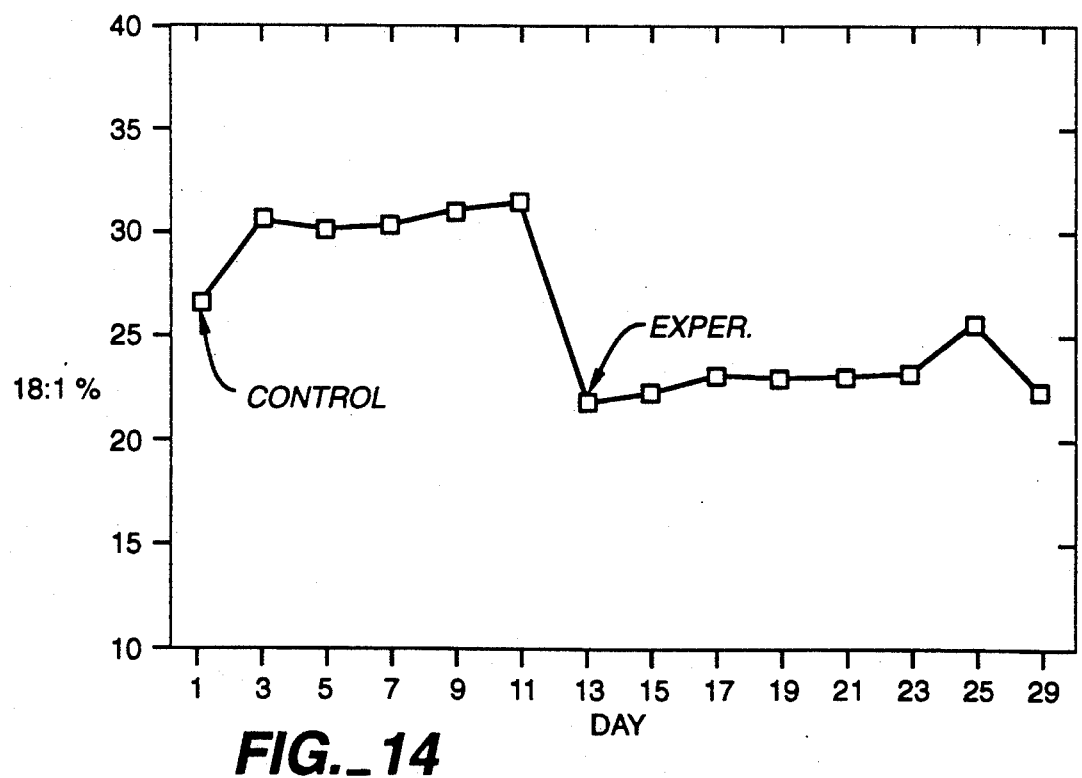
FIG._14

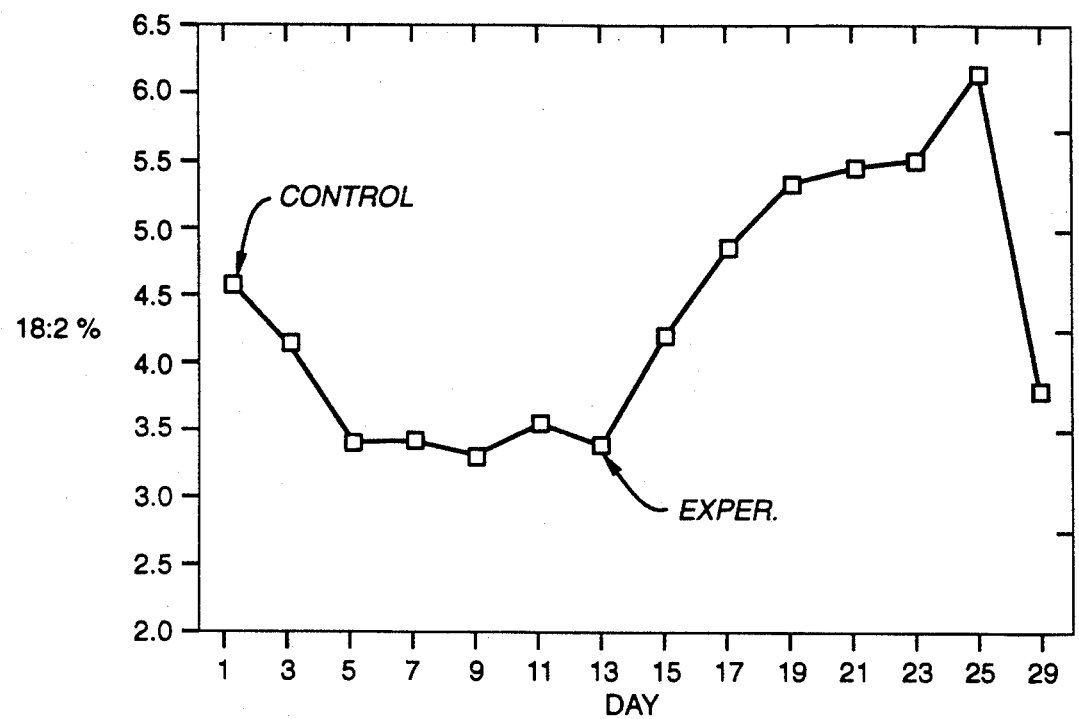
FIG._15
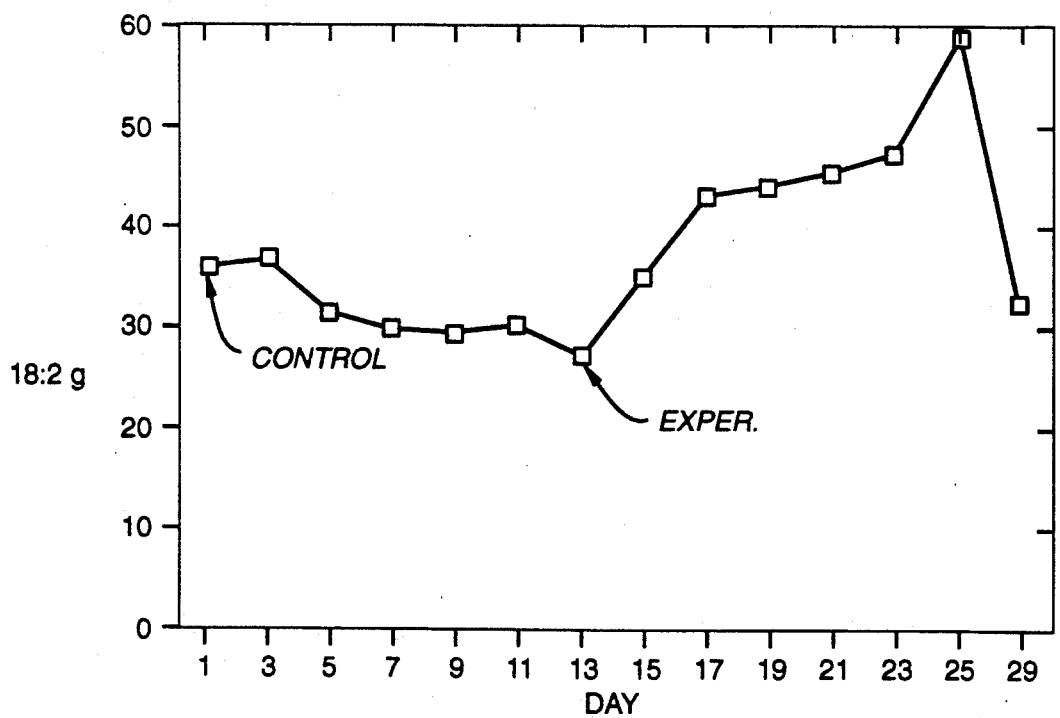
FIG._16

METHOD TO PRODUCE UNSATURATED MILK FAT AND MEAT FROM RUMINANT ANIMALS

BACKGROUND OF THE INVENTION

Origin of the Invention

This application is a continuation-in-part application of U.S. Ser. No. 420,905, filed Oct. 13, 1989 abandoned which is incorporated by reference in its entirety.

Field of the Invention

The present invention relates to the modification of an unsaturated substance, e.g., a lipid, as a food supplement for ruminant mammals, such as cattle, sheep, goats and the like, to produce modified milk fat and meat fat from such a mammal. More specifically, the present invention relates to the modification of an unsaturated lipid by treatment with a protein, such as whey protein and a reducing sugar which surrounds the lipid particles. By encapsulation of polyunsaturated carboxylic acids using non-toxic organic materials, the unsaturated aliphatic carboxylic acid is not hydrogenated in the first or second stomachs of the ruminant animal. Milk and meat is obtained having lowered saturated fats and increased unsaturated fats.

Description of Related Art

There is heightened public awareness of the deleterious effects of consumption of high levels of saturated fats. Health conscious people are trying to change the type of fat they eat, e.g. replacing saturated fats with polyunsaturated fats. Ruminant fats, including milk fat, usually have a high proportion of saturated fats, although the fat in ruminant diets is primarily unsaturated. These dietary polyunsaturated fats undergo hydrogenation to saturated fats by microbial action in the rumen.

The following references are of general and specific interest in the present invention:

1. K. A. Ferguson, et al. (1967), *Australian Journal of Science*, Vol. 30:215.
2. J. Bitman, et al. (1973), "Efficiency of transfer of polysaturated fat into milk," *J. Am. Oil Chem. Soc.*, Vol. 50:93.
3. L. Maynard, et al. (1979), *Animal Nutrition*, McGraw-Hill Book Co., New York, N.Y., p. 443.
4. A.O.A.C. current edition, *Official Methods of Analysis*, Ass. Offic. Agr. Chem., Washington, D.C.
5. C. M. Stine, et al. (1952), "Preparation of milk fat. A new method of manufacturing butteroil." *J. Dairy Sci.*, Vol. 35:655.
6. E. T. Finocchiaro, et al. (1984), *JOACS*, Vol. 61:5.
7. S. W. Christopherson, et al. (1970), "Preparation of milk fat methyl esters by alcoholysis in an essentially nonalcoholic solution," *J. Dairy Sci.*, Vol. 52:1289.
8. C. Gall (1981), *Goat Production*, Academic Press Inc., New York, p. 329.
9. T. W. Scott, et al. (1971), "Protection of dietary polyunsaturated fatty acids against microbial hydrogenation in ruminants," *JOACS.* Vol. 48:358-364.
10. Y. S. Pan, et al. (1972) "Formaldehyde-treated casein-safflower oil supplement for dairy cows," *J. Dairy Research*, Vol. 39-203-210.
11. L. J. Cook, et al. (1971), *J. Dairy Res.*, "Formaldehyde-treated casein-safflower oil supplement for dairy cows part 2." Vol. 39:211-218.
12. USDA Handbook #8. *The Composition of Foods.*
13. Y. T. Yang, et al. (1978), "Dietary Lipid Metabolism in Lactating Dairy Cows," *J. Dairy Sci.*, Vol. 61:1400.
14. W. Mattos, et al. (1974), "Increased Polyunsaturated Fatty Acid Yields in Milk Cows Fed Protected Fat," *J. Dairy Sci.*, Vol. 57:1051.
15. R. D. Plowman, et al. (1972), "Milk fat with increased polyunsaturated fatty acids," *J. Dairy Sci.*, Vol. 55:204.
16. W. N. Garrett, et al. (1976), "Increasing polyunsaturated fat content of beef and lamb," *J. An. Sci.*, Vol. 42:845.
17. J. H. Moore, et al. (1968), "Dietary fat and milk secretion in the cow," *Hannah Dairy Research Institute Symposium Proceedings*, Vol. 27:66.
18. S. B. Tove, et al. (1963), "Effect of dietary and injected fat on the fatty acid composition of bovine depot fat and milk fat," *J. Dairy Sci.*, Vol. 46:686.
19. W. Banks, et al. (1976), "Effect of feeding fat to dairy cows receiving a fat-deficient basal diet," *J. Dairy Res.*, Vol. 43:219.
20. R. M. Rawlings, et al., U.S. Pat. No. 4,216,234 issued Aug. 5, 1980, class 426/2.

This patent discusses the use of blood protein as an encapsulating agent for lipids. The pH of formation of the encapsulated particle about 9.6-12.5 or higher. Under these high pH conditions, it may be expected that the gel would crosslink through the lysinoalanine amino acids. There is a description of the formation of a gel, but no description for the formation of an emulsion. There is no description of heating or browning wherein lactose is present in the whey protein. All description is the delactosed whey. Indeed, when the gelation was attempted at pH of 8 or greater no gel was formed. This reference would lead away from the present invention.

21. C. P. Freeman, U.S. Pat. No. 4,808,429, issued February 1989, class 426/98.
22. G. H. Kraft, U.S. Pat. No. 2,035,899, issued March 1936, class 426/98.
23. C. K. Lyon et al., U.S. Pat. No. 4,248,899, issued Feb. 3, 1981, class 426/98.
24. S. Soloway, et al., U.S. Pat. No. 3,137,631, issued Jun. 16, 1964, class 167/83.
25. C. W. A. Kleine et al., U.S. Pat. No. 2,472,663, class 99-2.
26. P. Hirsbrunner, U.S. Pat. No. 4,839,179, issued Jun. 13, 1989, class 426/98.
27. I. M. Sashaw, U.S. Pat. No. 3,295,986, issued Jan. 3, 1967, class 99/123.

T. Scott, et al., U.S. Pat. No. 4,073,960, discloses the use of a dietary protein which is crosslinked using an encapsulating aldehyde to protect an unsaturated lipid content to ultimately increase the level of unsaturated milk fat and meat fat. However, the use of an aldehyde for such protein encapsulation is not desirable, as it may harm the animal's digestive track or produce undesirable metabolities.

All of the references, articles, patent standards and the like cited are expressly incorporated herein by reference in their entirety.

Protection of unsaturated dietary fat from the digestive action of the rumen microbes found in the digestive tract of ruminant animals, by encasing such fat in an aldehyde, e.g., formaldehyde, crosslinked-protein coat. This coat is stable at the pH of the rumen has been previously shown. The primary advantage of the approach of the present invention however, is that in the more acidic environment of the abomasum, however, the aldehyde cross-linked coating is hydrolyzed and the polyunsaturated fats are liberated for absorption and transfer to the milk resulting in increased polyunsaturated fatty acid content. (See Ref. 1, 2 above) In addition to increasing the polyunsaturated fatty acid percentage of the milk fat, encapsulated fats provide a high energy density feed source for the lactating animal without adversely affecting the rumen ecology. Unfortunately, formaldehyde is expensive, toxic, and not approved for use in products for human consumption.

Partial success in encapsulation was achieved in protecting unsaturated fatty acids in feed using glutaraldehyde as an added crosslinking agent. However, the use of glutaraldehyde is not without its drawbacks, such as biohazard and added expense.

It would therefore be very desirable to have available a safe and inexpensive method to modify milk fat or meat fat at a reduced level of undesirable saturated fats by encapulation of an unsaturated lipid at a pH of between about 6-8.5, and the increased level of desirable unsaturated fats. The present invention provides such process to achieve this result.

SUMMARY OF THE INVENTION

The present invention relates to a method for the modification of a food for a ruminant mammal which modification results in modified milk fat or meat fat having reduced amount of saturated fat and an increased amount of unsaturated fat, which method comprises:
(a) producing an emulsion comprising
  (i) a non-toxic food substance to be encapsulated; and
  (ii) an acid and enzyme sensitive non-toxic crosslinkable material which is able to surround and encapsulate the substance;
(b) subjecting the emulsion obtained in step (a) to reaction conditions which crosslink the crosslinkable material and encapsulate the substance at a pH of between about 5 to 8.5;
(c) mixing the encapsulated material of step (b) with the animal's feed; and
(d) feeding the modified feed to the animal.

In a preferred embodiment the non-toxic food substance is a non-toxic mono or polyunsaturated lipid.

In a preferred embodiment the method further includes step
(e) obtaining the modified milk fat or meat fat.

Browning of a dietary protein without an added hazardous crosslinking agent is an effective method to protect oils from biohydrogenation in the rumen. Browning does not appear to be quite as effective as glutaraldehyde for long-term supplementation with protected fat, although it does have the advantage of being more economical since it is an in situ reaction, and it uses no additional hazardous chemicals.

Protection of substances, e.g., fats, could be useful in several ways as previously mentioned. First, protected fat is used as a high energy density supplement in the diets of lactating ruminants. It is also possible to protect other lipid soluble substances which would normally be metabolized by the rumen microbes. The ability to manipulate the composition of the ruminant fats by dietary means enables the production of naturally synthesized milk and milk products with a much higher ratio of polyunsaturated to saturated fatty acids.

The commercial preparation of dairy products having high polyunsaturated fat content may have a tendency to undergo autoxidation. These problems may be solved by addition of an addition of an antioxidant such as Vitamin E to the diet of the ruminant, or to the final dairy product.

The added protein is crosslinked under conditions of the Malliard browning reaction. The crosslinked protein is less digestible in the pH, microbes, and enzymes found in the first and second stomach chambers. However, in the more acidic environment of the abomasum and in the presence of proteolytic enzymes, such as pepsin, the coating is hydrolyzed and the encapsulated lipids are liberated for absorption and transfer to the milk and meat fat.

The method described herein is particularly useful when the lipid has two or more C=C separated by one methylene groups to obtain a polyunsaturated milk fat or meat fat.

BRIEF DESCRIPTION OF THE FIGURES

FIG. 1 is a graph of milk yields from the control group of goats fed a normal diet.

FIG. 2 is a graph of the milk yields from goats fed with a supplement of unprotected fatty acid emulsion.

FIG. 3 is a graph of the milk yields from goats fed with a supplement of protected polyunsaturated fats.

FIG. 4 is a graph of the milk fat production (grams/day) of the control group of goats fed a normal diet.

FIG. 5 is a graph of the milk fat production (grams/day) of the group fed unprotected emulsion.

FIG. 6 is a graph of the milk fat production (grams/day) of the group of goats fed protected emulsion.

FIG. 7 is a graph of the linoleic acid produced by the control group of goats fed the normal diet.

FIG. 8 is a graph of the linoleic acid produced by the group of goats fed the unprotected emulsion.

FIG. 9 is a graph of the linoleic acid (% by weight) produced by the group fed the browned emulsion.

FIG. 10 is a summary graph of the milk yield from the three groups of goats.

FIG. 11 is a summary graph of the fat production (% by weight of milk) from the three groups of goats.

FIG. 12 is a summary graph of the lineolic acid production (% by weight of fatty acids present/day) from the three groups of goats.

FIG. 13 is a graph of the average daily stearic acid (18:0) percent in the milk fat yields of four lactating Holstein cows fed Browning encapsulated corn oil at 3.0 percent by weight of total diet.

FIG. 14 is a graph of the average daily oleic acid (18:1) percent in the milk fat yields of four lactating Holstein cows fed Browning encapsulated corn oil at 3.0 percent by weight of total diet.

FIG. 15 is a graph of the average daily linoleic acid (18:2) percent in the milk fat yeilds of four lactating Holstein cows fed Browning encapsulated corn oil at 3.0 percent by weight of total diet.

FIG. 16 is a graph of the overall daily average of the linoleic acid (18:2) in the milk fat yields produced by four lactating Holstein cows in total grams of linoleic acid from daily milkings twice a day.

DETAILED DESCRIPTION OF THE INVENTION AND PREFERRED EMBODIMENTS

Definitions:

As used herein:

"Material" refers to any chemical or biochemical grouping which is generally recognized as safe as a food whether in a uncrosslinked or crosslinked form. Preferably the material is a protein or protein derivative such as whey protein.

"Modifying agents" refer to flavoring, antioxidant, vitamins, minerals, hormones, texturing, and the like substances employed for their respective effects upon meat, fat or butter products of the ruminant. Optionally, modifying agents are added to the modified food of the present invention to achieve specific favorable effects.

"Protein" refers to any natural, dietary, or synthetic protein which is generally recognized as safe as a food for a mammal whether in an uncrosslinked or crosslinked state. "Protein" also includes whey protein, soy protein, cereal protein, rice protein, peanut protein, fish protein, casein, gelatin or mixtures thereof. Natural reducing sugars may be added in small amounts to facilitate the crosslinking of the protein in the encapsulating step. Whey protein is preferred.

"Substance" refers to any natural or synthetic chemical, or combination of chemicals or biochemicals which are non-toxic and are generally recognized as safe as food stuffs for ruminant mammals.

"Unsaturated" refers to organic compounds having at least one carbon-carbon double bond (C=C). Preferably the organic compound will have two or more C=C groupings that are separated by at least one methylene group.

C18:2 (and similar abbreviations) refer to an organic carboxylic acid having 18 carbons and 2 C=C bonds that are generally separated by one methylene group.

"Unsaturated animal or vegetable fat, lipids or oils" as substances refers to oils for soya beans, peanuts, sunflowers, safflower, cotton seeds, maize, corn, rape from animal fats or the like. Polyunsaturated corn oil is preferred.

In practice the present invention comprises selecting the food (e.g., unsaturated lipid) to be encapsulated, selecting the encapsulating agent as protein, such as whey protein concentrate, which includes the reducing sugar, lactose, preparing an emulsion of the encapsulating agent (e.g., whey protein), combining and mixing the food and the emulsion maintaining the emulsion, naturally crosslinking the emulsion (in the absence of added toxic or hazardous chemicals), and recovering the naturally encapsulated food. One substance, (food) such as an unsaturated lipid, is selected to be encapsulated.

The food substances to be encapsulated may include any nontoxic food or feed additive. Preferably, the food is a mono or polyunsaturated lipid. More preferably, unsaturated animal or vegetable fat or oils are used. Especially useful are compositions of oleic acid, linoleic acid or mixtures thereof.

The uncrosslinked crosslinkable natural material, such as whey protein concentrate and lactose, is added and an emulsion is formed of the mixture by methods conventional in the art. Whey protein concentrate is available from Dairyman Cooperative located at 400 South M Street, Tulare, Cal. 93274. The concentrate is about 30-35% whey, 60-65% lactose and 1-2% water. For example, an emulsion is formed by contacting corn oil (e.g., linoleic acid) and whey protein concentrate containing lactose for under atonizing conditons using a conventional dairy homogonizer at 1500 to 2000 psi, such as a single stage dairy homogenizer. Excess water is removed from the emulsions formed using a conventional mechanical cream separator.

Whey protein concentrate with lactose present usually has a pH of 5-6 (sweet cheese). It can be used for encapsulation as is, or it can be treated with base, such as aqueous sodium hydorxide, to obtain a pH of 6-8.5. This concentrate and lactose) is then mixed with the lipid to obtain an emulsion. Any excess water may be removed by mechanical separation. The emulsion is adjusted to pH of about 6-8.5, preferably 7-8, more preferably 7-7.5, and the emulsion is browned. It is believed that the browning is a crosslinking condensation reaction which occurs between the amino groups and carbonyl groups and also produces water. Other encapsulating materials include, for example any combination of protein and a reducing sugar, blood, serum protein and maltose glucose, etc. The concentrated emulsion at a pH of about 6-8.5 preferably 7-8, more preferably 7-7.5 is subjected to browning reaction conditions by drying in hot air (65° C. to 110° C.).

The naturally occurring lactose in the whey protein concentrate is known to be a natural crosslinking agent. Due to such material crosslinking properties of whey protein, consequently the whole process is chemical free as it utilizes only naturally occurring safe materials. Therefore the ultimately obtained modified milk or meat for the human consumer is not exposed to undesirable or dangerous chemicals or their metabolities. No artificial chemical, such as formaldehyde, acetaldehyde or the like are needed to be added.

It is sometimes possible to obtain the protein and the unsaturated oil to be encapsulated from the same source without significant separation. Usually, these materials are finely divided or are suspended to obtain the necessary level of encapsulation. Particles of up to about 10 microns in diameter are useful. Particles up to about 5 microns are preferred. Particles of between about 1-5 microns in size are more preferred.

Water can be removed from the emulsion using a conventional mechanical cream separator. The protein may contain or have added any dietary reducing sugar.

The product emulsion is dried and subjected to browning in hot air between about 65° to 190° C. for 2-72 hr. preferably 110° C. for about 48 hr. to crosslink the material and encapsulate the substance (e.g., corn oil). The Maillard browning reaction (R. E. Feeney, et al. (1982) "Maillard Reaction and Its Prevention" in *Food Protein Deterioration*, J. P. Cherry (ed.), ACS Symposium Series 206, American Chemical Society, 1155 16th Street, N.W., Washington, D.C. 20036, p. 201-229) involves a combination of the amino acids in whey protein with the reducing sugar lactose. It has been shown in Reference 3 that this reaction renders the protein less digestible. This invention shows that the protein protects unsaturated fat (e.g.) linoleic acid from hydrogenation as well. The effects on milk composition of feeding a corn oil-whey protein emulsion browned in an oven, are compared with the effects of the same emulsion unbrowned.

In one procedure, unsaturated lipid chosen to be encapsulated, and such as corn oil and protein to be used for cross linking and encapsulation are combined in a buffer, such as a phosphate buffer 0.01M in mono- and dibasic phosphate at about 20°-60° C., preferably 46° C. This mixture is homogenized by standard homogenizer, e.g. by the solution being forced through a small opening using a Crepaco homogenizer from Creamery Package Co., Inc., Lake Mills, Wis.

The homogenized mixture obtained (about 2 kg) is then reduced in volume about "50%" using any vacuum evaporator, e.g. Pfaudler evaporator, (e.g., pulling about 28 in. mercury vacuum) single effect at a temperature between about 35° and 65° C. The emulsion thus obtained has the consistency of standard mayonnaise or heavy whipped cold whole cream. Alternatively, water can be removed from the emulsion by a conventional mechanical cream separator. The thickened emulsion (about ⅛ to 0.25 inch thick) is then spread on a stainless steel tray and baked at between about 40°-110° C. pref. 110° C. in a drying tunnel for 4–48 hours, preferably about 48 hr. An air current preferably of about 80 cc/min, is used to speed the browning reaction. In an alternative preparation, the emulsion is concentrated by removal of the water at reduced pressure, spray dried through an atomizing nozzle, and then browned (baked) as above. The Maillard browning reaction may be performed at a variable number of heating, time and environment conditions. These conditions range from between about 1 hr to 60 days at between about 25° and 190° C. Preferred conditions include between about 12 and 72 hr at between about 25° and 120° C., especially about 110° C. for 48 hr. More preferred conditions include between about 90° C. to 110° C. for between about 24 and 48 hrs, especially about 110° C. for 48 hr. One higher temperature embodiment is about 190° C. for 1 hr. When the browned emulsion becomes solid, it can be milled to a desired particle size and be used as the feed supplement for the animal.

The encapsulated lipid is then made part of a usual diet for the ruminant animal, usually 2–15 percent by weight, preferably about 3–10% by weight.

Changes in milk yield, total protein, casein fraction of protein, total fat, and fatty acid composition of the milk were monitored. Experimental details are found in Example 1 below.

In testing the ulility of this invention the goats were fed a diet containing about 8.6 weight percent of the polyunsaturated corn oil protected by the described browning process. The feeding conditions may be those selected by those of skill in this art described in U.S. Pat. No. 4,073,960 of 500 g/kg per cow of protected corn oil are exemplary.

As shown in FIGS. 1, 2 and 3, the milk yields for the goats intends to increase. This increased production can probably be attributed to the early lactational stage of the goats, rather than to the experimental treatment. In addition, there is evidence from previous experiments that supplementation of ruminant diets with protected fat, or with unprotected fat at levels below 6–10% have little effect on milk yield. (See Ref. 15.)

The results obtained in feeding experiements on the goats are summarized in FIGS. 1, 2 and 3. The figures show the daily yields of milk for each group. FIGS. 1, 2 and 3. These goats were at the beginning of their lactations. Therefore, an increased milk yield was expected. (See Ref. 8.) As usual, the milk yields tended to vary in relation to feed intake. However, there appeared to be anincreased yield of milk fats. This unexpected increased yield of milk fat is of importance to the dairy farmer from an economic standpoint, because milk having a higher fat content usually commands a higher price.

Fat content of the milk increased for the goats fed the browned and unbrowned fat emulsions. Fat production showed little change in the control goats. (See FIGS. 4, 5 and 6.) If unprotected fat were fed at a level greater than 10% of the diet, the milk fat production would have been significantly reduced due to the harmful effects of high fat levels on the rumen microbes. (See Ref. 9.) Other researchers have shown that protected fat, fed at levels that would normally be poisonous if unprotected, are readily consumed and utilized by ruminants. (See Ref. 16.) Protected fat (lipid) has potential usefulness as a high energy density feed for lactating ruminants. Further having a relatively low cost method to increase the fat content of the milk is an economic incentive to the dairy farmer.

Mean daily yields of total fat for each group are shown in FIGS. 4, 5 and 6. Total fat produced increased for both group 2 (unbrowned) and group b 3 (browned), while the goats on the pelleted diet maintained a steady level of fat production. (See Ref. 9.)

Fatty acid composition of the milk, however, was quite different in the two experimental groups as discussed below.

Fatty Acid Composition of the Milk from goats fed with browned or unbrowned feed.

Tables 1, 2 and 3 below show the weight percentages of the major fatty acids in the milk fat from the cream for all of the goats for the duration of 13 days of the experiment. The browned whey protein-corn oil supplement caused a marked increase in the proportion of linoleic acid (C18:2) in milk glycerides of all three goats in that group (see graph #9) Values of 10–13% were obtained initially, followed by a drop to 8%. This increase in linoleic acid (C18:2) was accompanied by decreases in the proportions of lauric acid (C12:0), myristic acid (C14:0) and palmitic acid (C16:0) (0, C=C present) which agree with report by Pan. (See Ref. 10.) The remainder of the short chain fatty acids in the milk from the goats fed browned compositions either decreased slightly or remained constant.

Protein and casein were also measured. Usually a normal high level fat diet results in lowered protein in the milk. However, the protected fat of the present invention delivers a high energy food but, the expected usual depressed protein level in the milk fat is not found.

TABLE 1

| | | CONTROL GROUP | | | | | |
|---|---|---|---|---|---|---|---|
| | | DATES | | | | | |
| Goat # | | 3/25 | 3/26 | 3/28 | 3/31 | 4/3 | 4/6 |
| | | Milk Fatty Acid Composition (Weight Percent) | | | | | |
| 7001 | C12 | 4.13 | 4.17 | 4.15 | 5.57 | 5.25 | 5.57 |
| | C14 | 8.23 | 8.3 | 8.46 | 9.21 | 11.43 | 11.16 |
| | C16 | 21.58 | 23.07 | 21.24 | 22.33 | 23.95 | 23.57 |
| | C16:1 | 2.86 | 2.95 | 2.91 | 2.27 | 1.98 | 2.29 |
| | C18 | 9.4 | 9.77 | 9.54 | 9.07 | 9.47 | 9.89 |
| | C18:1 | 21.36 | 20.7 | 18.3 | 18.29 | 22.53 | 21.63 |
| | C18:2 | 4.6 | 4.61 | 4.62 | 4.59 | 4.15 | 3.52 |
| 7012 | C12 | 3.27 | 3.23 | 3.41 | 3.81 | 4.03 | 3.98 |
| | C14 | 8.91 | 8.71 | 8.75 | 8.65 | 9.12 | 8.94 |
| | C16 | 24.04 | 22.36 | 23.14 | 22.94 | 23.7 | 22.66 |
| | C16:1 | 3.27 | 2.66 | 2.41 | 2.31 | 2.28 | 2.5 |
| | C18 | 10.01 | 10.07 | 10.53 | 10.71 | 10.6 | 10.16 |
| | C18:1 | 28.88 | 33.41 | 33.26 | 31.84 | 29.88 | 30.48 |
| | C18:2 | 4.63 | 4.61 | 4.6 | 4.66 | 4.38 | 4.76 |
| 7029 | C12 | 3.22 | | 3.86 | 3.13 | 3.96 | 4.13 |
| | C14 | 7.06 | | 8.34 | 8.51 | 10.16 | 10.07 |
| | C16 | 20.9 | | 22.67 | 22.85 | 23.96 | 24.54 |
| | C16:1 | 2.95 | | 2.19 | 2.24 | 2.31 | 2.62 |
| | C18 | 10.26 | | 10.92 | 10.89 | 9.96 | 10.5 |
| | C18:1 | 28.04 | | 30.5 | 29.07 | 29.97 | 29.79 |
| | C18:2 | 5.44 | | 4.76 | 4.66 | 4.51 | 3.83 |

TABLE 2

UNBROWNED EMULSION-FED GROUP

| Goat # | | 3/25 | 3/26 | 3/28 | 3/31 | 4/3 | 4/6 |
|---|---|---|---|---|---|---|---|
| | | \multicolumn{6}{c}{Milk Fatty Acid Composition (Weight Percent)} | | | | | |
| 7008 | C12 | 2.6 | 2.99 | 3.72 | 2.76 | 2.74 | 2.8 |
| | C14 | 8.75 | 8.32 | 8.93 | 7.89 | 7.04 | 6.9 |
| | C16 | 25.25 | 24.24 | 24.46 | 22.85 | 21.01 | 20.7 |
| | C16:1 | 2.41 | 2.24 | 1.98 | 2.14 | 1.96 | 2.38 |
| | C18 | 8.54 | 8.38 | 8.21 | 10.35 | 11.65 | 10.17 |
| | C18:1 | 25.4 | 25.57 | 25.42 | 29.89 | 30.66 | 30.67 |
| | C18:2 | 3.57 | 3.95 | 4 | 4.65 | 4.39 | 4.35 |
| 7036 | C12 | 2.31 | 1.89 | 2.31 | 2.88 | 2.22 | 2.14 |
| | C14 | 7.49 | 7.26 | 7.34 | 7.52 | 6.3 | 5.86 |
| | C16 | 20.5 | 21.25 | 22.94 | 18.13 | 18.28 | 17.64 |
| | C16:1 | 2.63 | 2.55 | 2.03 | 1.86 | 2.13 | 2.51 |
| | C18 | 8 | 8.71 | 9.11 | 13.76 | 12.56 | 12.54 |
| | C18:1 | 30.42 | 31.88 | 31.83 | 32.54 | 36.53 | 37.54 |
| | C18:2 | 5.68 | 5.86 | 5.92 | 5.19 | 5.28 | 5.46 |

TABLE 3

BROWNED EMULSION-FED GROUP

| Goat # | | 3/25 | 3/26 | 3/28 | 3/32 | 4/3 | 4/6 |
|---|---|---|---|---|---|---|---|
| | | \multicolumn{6}{c}{Milk Fatty Acid Composition (Weight Percent)} | | | | | |
| 7011 | C12 | 3.01 | 3.89 | 3.49 | 2.74 | | 2 |
| | C14 | 9.09 | 9.41 | 9.6 | 7.68 | | 5.65 |
| | C16 | 22.85 | 25.08 | 23.79 | 20.05 | | 17.81 |
| | C16:1 | 2.66 | 2.44 | 2.4 | 1.63 | | 2.6 |
| | C18 | 10.22 | 10.39 | 10.94 | 10.87 | | 10.72 |
| | C18:1 | 23.7 | 23.59 | 24.51 | 28.57 | | 37.16 |
| | C18:2 | 5.36 | 5.94 | 5.37 | 12.22 | | 8.41 |
| 7016 | C12 | 2.82 | 2.41 | 2.4 | 1.94 | 1.52 | 1.42 |
| | C14 | 9.12 | 9.03 | 9.43 | 7.48 | 6.49 | 5.45 |
| | C16 | 27.49 | 24.83 | 27.7 | 24.62 | 22.46 | 21.22 |
| | C16:1 | 2.82 | 2.93 | 2.43 | 2 | 2.46 | 2.8 |
| | C18 | 9.9 | 11.82 | 10.27 | 9.1 | 9.44 | 10.07 |
| | C18:1 | 26.12 | 29.32 | 29.42 | 31.72 | 35.16 | 37.99 |
| | C18:2 | 5.01 | 5.39 | 5.84 | 9.77 | 8.13 | 7.18 |
| 7031 | C12 | 3.67 | 2.51 | 2.9 | 2.13 | 1.78 | 1.99 |
| | C14 | 8.51 | 8.09 | 8.52 | 5.63 | 5.14 | 5.47 |
| | C16 | 23.77 | 21.08 | 24.37 | 19.71 | 18.32 | 19.34 |
| | C16:1 | 2.49 | 2.63 | 2.02 | 2.03 | 2.19 | 2.24 |
| | C18 | 10 | 10.07 | 9.5 | 9.49 | 9.96 | 9.92 |
| | C18:1 | 24.49 | 23.64 | 29.01 | 32.93 | 37.36 | 34.66 |
| | C18:2 | 4.45 | 4.65 | 4.99 | 13.14 | 8.44 | 8.19 |

Although the total milk fat production increased for both experimental groups of goats, the fatty acid composition of the milk was quite different in the two groups. Table 3 clearly shows that the inclusion of a browned whey protein-corn oil supplement in the diets of goats caused an increase in the C18:1 and C18:2 content of milk, which was expected, given the composition of corn oil. The inclusion of a similar quantity of unprotected supplement did not result in a similar increase in polyunsaturated fatty acid content of milk.

The levels of fatty acids in the milk of ruminants depend largely on the activities of two metabolic processes. In the first of these, acetate and butyrate are taken up from the blood and are then utilized as precursors for de novo synthesis in a mammary gland of the fatty acids from 4:0 to 10:0, hence these fatty acids are considered to be of endogenous origin. In the second process, triglycerides circulating in the blood as chylomicra and low density lipoproteins are taken up by the mammary gland, and subsequently transferred into the milk. The longer chain fatty acids such as C12, C14, C16–C18 are incorporated into milk in this manner. These fatty acids are considered to be of exogenous origin, since they come from the diet of the animal. (See Ref. 17.)

Although C18:1 and C18:2 in the milk come originally from the diet of the ruminant, simply feeding more of them will not increase their levels in the milk. Goats fed a supplement high in C18:2 show only slight increases in 18:2 in the milk, although C18:1 and C18:0 increase significantly. The conclusion of Tove and Mochrie (see Ref. 18) is that this is an indication of the efficiency and completeness of hydrogenation by the rumen microbes. The browned supplement seemed initially to escape this hydrogenation to about the same extent as the glutaraldehyde protected supplement (FIG. 9) as evidenced by the efficiency of transfer of the C18:1 and C18:2 into the milk of the goats fed the supplement. After about a week of supplementation with browned emulsion, however, the efficiency of transfer of C18:2 decreased somewhat while the efficiency of transfer of C18:1 shot up to levels greater than 100%. Not wanting to be bound by theory, this result suggests the possibility that the rumen microbes were able to adapt and develop the ability to break down the browned supplement and hydrogenate some of the linoleic acid (18:2) into oleic acid (18:1). Alternatively, different batches of food also may have browned to varying degrees. This theory would explain both the decrease in the goats fed the browned and unbrowned oil emulsions. This effect was also observed by (see Ref. 21). Two possible reasons for this decrease are suggested. First of all, high levels of unsaturated fats cause decreases in the rumen concentrations of the volatile fatty acid precursors for fatty acid synthesis and therefore short chain fatty acid production is decreased due to lack of substrates. Another possible mechanism is suggested that increased long chain fatty acids in the diet result in increased uptake of these fatty acids by the mammary gland. Once in the mammary gland, these long chain fatty acids inhibit Acetyl CoA carboxylase which is an important enzyme involved in mammary gland de novo synthesis of fatty acids. (See Ref. 17.)

Other researchers have reported increases in the proportions of oleic acid (C18:1, an 18 carbon acid having one C=C) in the milk fat of ruminants fed diets high in polyunsaturated fatty acids. (See Ref. 11.) Corn oil, the unsaturated fat supplement in this study, is 53% linoleic acid (C18:2, an 18 carbon acid having two C=C separated one methylene group) and 28% oleic acid (see Ref. 12), so it was expected to see an increase transfer of both of these unsaturated fatty acids into the milk. The efficiency of transfer of linoleic acid into the milk fat of the goats was initially 18% for two of the three goats, dropping to 10–12% by the end of the study. The remaining goat in this group showed no change in efficiency of transfer of linoleic acid from the feed into the milk (9.5%).

Efficiency of transfer of oleic acid was quite high (94–118%). Values this high indicate that not all of the oleic acid in the milk came from the oleic acid in the feed. It may have been produced by enzymatic dehydrogenation of stearic acid in the mammary grand.

Further, the two goats in group 2 showed somewhat different responses to the unbrowned fat emulsion. The linoleic acid (C18:2) content in the milk of these goats showed no significant change. (See FIG. 8.) The efficiency of transfer of linoleic acid from the feed to the milk was about 5%. Oleic acid % increased slightly as did the percentages of steric acid (C18:0). Short and medium chain fatty acids decreased which is consistent with the findings of other researchers feeding a protected fat supplement. (Also see Ref. 13, 14.)

The control group demonstrated a slight decrease in C18:2 as seen in FIG. 7. Short chain fatty acid increased slightly, while the remaining fatty acids were essentially unchanged.

The following Examples are presented as being descriptive and illustrative only. They are not to be construed as being limiting in any way.

EXAMPLE 1

Preparation of the Corn Oil-Whey Protein Emulsion 6.8 Liters of sodium/potassium buffer (equal amounts of 0.01M $Na_2HP_4$ and 0.01M $NaH_2PO_4$), 3.0 liters of corn oil, and 1364 g of whey protein concentrate (35% whey protein, 65% lactose), were mixed together by hand. The mixture was then heated to 46° C. in a water bath. The emulsion was produced by a one-step homogenization at 1500 psi. This emulsion was then washed two to three times through a cream separator. The resulting liquid emulsion was then freeze-dried dried. Half of this freeze-dried emulsion was placed in pyrex pans and browned in a radiant heat oven at 100° C. for 4-8 hr. Both emulsions were kept at 0° C. until used.

Both the browned and unbrowned freeze-dried emulsions were analyzed by ether extraction and by Kjeldahl and found to be 84% fat and 6% protein. The remaining 10% is believed to be primarily lactose. These feed composition figures are essentially the same as for the emulsions produced for the glutaraldehyde study, indicating that the emulsification process is consistent.

Animals and Treatments—Goats: Three groups of three goats each, all near the start of their lactations, were fed for three weeks. During the first week, all of the goats ate 1.5 kg of a standard pelleted goat ration so that baseline data for milk composition could be obtained. Starting in week two, group two was fed unbrowned emulsion at 8.6% of their diet and group one remained on the pelleted goat ration for the duration of the experiment. Goats were milked twice daily at twelve hour intervals, and milk samples were collected twice each week. It was necessary to drop a goat from group two at the outset of the experiment due to a teat injury. Also, a goat was dropped from the control group 2 days before the end of the experiment when she developed an illness unrelated to the study. The results are shown and summarized in Tables 1, 2 and 3 in the FIGS. 1-12.

Cattle: Four lactating Holstein cattle (800-1500 lb. each) were selected and were each fed 23 kg. of a control food without encapsulated unsaturated fatty acid for 12 days to establish a base condition. On the 13th day each cow was fed a diet which contained 3.0% by weight of browned corn oil for 13-25 days (FIGS. 13, 14, 15 and 16). The amount of unsaturated fat (linoleic acid) as compared to saturated fat in the milk obtained is significant, nearly double for the cows when fed browned encapsulated corn oil linoleic acid. (See FIG. 16).

The overall average milk output obtained for these four test Holstein cows did not vary significantly (20-35 kg/day) over the 24 day experiments.

The overall average milk fat output obtained from the four test Holstein cows did not vary significantly (3.4 to 4.2% by weight) over the 24 day experiments.

Technical Analyses

The milk yield, total fat, total protein, were determined in the resulting milk fat for the control and experimental animals. The fatty acid concentration was determined by gas liquid chromatography as described below.

Analyses were performed on the milk samples from each sampling day for the duration of the study. Percentages of fat and total protein were determined on the milk samples using an infrared milk analyzer (Dairylab Multispec). These values were double-checked using Babcock for fat and Kjeldahl for protein and were found to be accurate. The casein fraction of the milk protein was precipitated from whole milk at a pH of 4.2. This was done by bringing 100 g of milk to 40° C. in a water bath and adding drop-wise 5.3 ml 3.33N acetic acid followed by 0.7 ml 3.33N sodium acetate while stirring continuously. The supernatant whey was filtered through Whatman 2v filter paper and analyzed for protein content by the Udy dye-binding method. (See Ref. 4) Casein percentage was calculated as total protein less the whey protein percentage.

Cream was isolated from the raw milk by centrifugation. 250 Milliliter sample bottles were spun at 3000 rpm for twenty minutes at 5° C. The milk fat was isolated from this cream by a modified method of Stine and Patton (Ref. 5) as described in Finocchiaro, Lee, and Richardson. (Ref. 6)

The resulting fat was stored under nitrogen at 0° C. until it was trans-esterified for analysis in the gas chromatograph. Transesterification to butyl-esters was performed by the method of Christopherson and Glass. (Ref. 7) The resulting esters of fatty acids were analyzed by temperature programmed gas chromatography on 10% EGSS-X on gas chrom P (100/120 mesh) in a 10 foot × ⅛ inch stainless steel column with a Hewlett-Packard model 5700A gas chromatograph. Nitrogen was the carrier gas and flow rate was 20 mls per minute. Temperature was 90° C. for the first two minutes, increasing after that at a rate of 4° C. per minute until it reached 200° C., where it was the held for 32 minutes.

While only a few embodiments of the invention have been shown and described herein, it will become apparent to those skilled in the art that various modifications an changes can be made in the modification of a food, preferably as an encapsulated polyunsaturated lipid, for a ruminant mammal such that the mammal will produce a modified milk fat or meat fat without departing from the spirit and scope of the present invention. This improved method makes it possible to utilize the whey protein concentrates without removal of the lactose present. All such modifications and changes coming within the scope of the appended claims are intended to be carried out thereby.

I claim:

1. An improved method for the modification of an unsaturated lipid containing food material, said method consisting essentially of:
    (a) producing an aqueous emulsion having
        (i) a non-toxic unsaturated lipid containing food material to be encapsulated; and
        (ii) an acid and enzyme sensitive non-toxic cross-linkable protein material which contains a non-toxic reducing sugar material, which materials surround and encapsulate said unsaturated lipid containing food substance at a pH of between about 5 to 8.5 to produce an emulsion which emulsion is then substantially dried;
    (b) subjecting the dried emulsion obtained in step (a) adjusted to a pH of about 7-8 to elevated temperature reaction conditions of between about 25° and 190° C. for between 2 and 72 hours to crosslink said crosslinkable protein material with a reducing sugar and encapsulate the lipid containing food substance;

(c) mixing the encapsulated material obtained in step (b) with a ruminant feed; and (d) feeding the modified food and feed mixture to a ruminant thereby to produce modified milk or meat having a reduced amount of saturated fat and an increased amount of unsaturated fat.

2. The method of claim 1 wherein the protein is whey protein concentrate containing lactose.

3. A method for the production of milk fat or meat fat having an elevated level of unsaturated fat, which method consists essentially of feeding a ruminant the modified food of claim 2.

4. The method of claim 1 wherein the ruminant is selected from the group consisting of cattle, sheep and goats to produce modified milk fat and meat fat wherein in step (a), the non-toxic food substance is at least one unsaturated fatty acid, and the acid sensitive non-toxic crosslinkage material is whey protein concentrate and a reducing sugar at a pH of about between and 6-8.5, and in step (b), the reaction conditions are heating at a temperature of between about 25° and 190° C. for between about 2 hr and 72 hr at a pH of between about 7-7.5.

5. A method for the production of milk fat or meat fat having an elevated level of unsaturated fat, which method consists essentially of feeding a ruminant the modified food of claim 4.

6. The method of claim 1 wherein in step (a)(i) the non-toxic food substance is an unsaturated lipid selected from oil from the group consisting of soya beans, peanuts, sunflowers, safflowers, cotton seed, maize, corn, rape and unsaturated animal fat, in step (a)(ii) the crosslinked material is a crosslinkable protein selected from the group consisting of whey, soy, cereal, rice, peanut, fish, casein protein, and gelatin; and in step (b) the reaction conditions are those of the Maillard browning reaction to crosslink the protein with a reducing sugar.

7. The method of claim 6 wherein crosslinking conditions are about 110° C. for about 24 hr.

8. A method for the production of milk fat or meat fat containing food substance having an elevated level of unsaturated fat which method consists essentially of:

(a) producing an aqueous emulsion having
  (i) a non-toxic unsaturated lipid food substance to be encapsulated; and
  (ii) an acid and enzyme sensitive non-toxic crosslinkable protein material containing a non-toxic reducing sugar material, which materials surround and encapsulate said unsaturated lipid containing food substance at a pH between about 5 and 8.5 to produce an emulsion which is then substantially dried;

(b) subjecting the dried emulsion in step (a) adjusted to a pH of about 7-8 to elevated temperature conditions of between about 65° and 110° C. for between 4 and 72 hours to crosslink the crosslinkable protein material and encapsulated the food substance;

(c) mixing the encapsulated food substance obtained in step (b) with a ruminant feed; and (d) feeding the food and feed mixture to ruminants thereby to produce modified milk fat or meat fat containing food having a reduced amount of saturated fat and increased amount of unsaturated fat.

* * * * *